United States Patent
Holzmann et al.

(10) Patent No.: US 10,965,491 B2
(45) Date of Patent: Mar. 30, 2021

(54) DEVICE FOR ENERGY AND/OR DATA TRANSMISSION

(71) Applicants: HELLA GmbH & Co. KGaA, Lippstadt (DE); LEONI Bordnetz-Systeme GmbH, Kitzingen (DE)

(72) Inventors: Frédéric Holzmann, Würzburg (DE); Michael Dubreuil, Saint Sulpice sur Lèze (FR)

(73) Assignees: HELLA GmbH & Co. KGaA, Lippstadt (DE); LEONI Bordnetz-Systeme GmbH, Kitzingen (DE)

( * ) Notice: Subject to any disclaimer, the term of this patent is extended or adjusted under 35 U.S.C. 154(b) by 0 days.

(21) Appl. No.: 16/332,201

(22) PCT Filed: Sep. 12, 2017

(86) PCT No.: PCT/EP2017/072914
§ 371 (c)(1),
(2) Date: Mar. 11, 2019

(87) PCT Pub. No.: WO2018/050648
PCT Pub. Date: Mar. 22, 2018

(65) Prior Publication Data
US 2019/0273632 A1   Sep. 5, 2019

(30) Foreign Application Priority Data
Sep. 13, 2016  (DE) .................. 10 2016 117 169.7

(51) Int. Cl.
*H04L 12/40* (2006.01)
*H04L 12/10* (2006.01)

(52) U.S. Cl.
CPC ........ *H04L 12/40045* (2013.01); *H04L 12/10* (2013.01); *H04L 12/40182* (2013.01);
(Continued)

(58) Field of Classification Search
None
See application file for complete search history.

(56) References Cited

U.S. PATENT DOCUMENTS

2008/0300750 A1* 12/2008 Davis ..................... H04B 3/546
                                                          701/36
2010/0187903 A1   7/2010 Diab et al.
(Continued)

FOREIGN PATENT DOCUMENTS

DE   102011088826 A1   6/2013
EP       2073435 A1   6/2009
WO   WO2012061625 A2   5/2012

OTHER PUBLICATIONS

Office Action for German Application No. 102016117169.7 dated Apr. 12, 2017, with an English summary, 7 pages.
(Continued)

*Primary Examiner* — Otis L Thompson, Jr.
(74) *Attorney, Agent, or Firm* — Bret E. Field; Bozicevic, Field & Francis LLP

(57) ABSTRACT

System (10) for energy and/or data transmission in a vehicle (15), with at least one node element (120) for the networked connection of at least two electric components (30) of the vehicle (15), so that different connecting paths are provided, and the transmission of energy and/or data occurs in an adaptable manner via at least one of the connecting paths.

12 Claims, 8 Drawing Sheets

(52) U.S. Cl.
CPC ............... *H04L 12/40195* (2013.01); *H04L 2012/40273* (2013.01)

(56) References Cited

U.S. PATENT DOCUMENTS

| | | |
|---|---|---|
| 2012/0054507 A1* | 3/2012 | Noel .................. H04L 12/12 713/300 |
| 2012/0173905 A1 | 7/2012 | Diab et al. |
| 2014/0129061 A1* | 5/2014 | Cooper ............. B61L 15/0036 701/19 |
| 2015/0217790 A1* | 8/2015 | Golden ............. B61L 15/0072 701/19 |
| 2017/0302462 A1* | 10/2017 | Yun .................. H04L 43/0817 |
| 2018/0287664 A1* | 10/2018 | Laifenfeld ............ H04B 3/542 |

OTHER PUBLICATIONS

Office Action for German Patent Application No. DE 10 2016 117 169.7, dated Sep. 17, 2019, and its English summary, 6 pages.

* cited by examiner

DEVICE FOR ENERGY AND/OR DATA TRANSMISSION

CROSS-REFERENCE TO RELATED APPLICATIONS

The present application claims the priority of German Patent Application No. 10 2016 117 169.7, filed on Sep. 13, 2016, and entitled "DEVICE FOR ENERGY AND/OR DATA TRANSMISSION," the entire contents of which are herein incorporated by reference.

BACKGROUND

Technical Field

The present invention relates to a system for data and/or energy transmission. The invention further relates to a method for data and/or energy transmission.

Background

The use of a plurality of electric, in particular electronic components in vehicles is known from the prior art. Common are e.g. the usage of safety and control devices, such as engine control and gearbox control, airbag, ABS, window lifters, and the like. Accordingly, many safety-relevant functions of the vehicle are at least in part provided by the electronics of the vehicle. Furthermore, comfort functions such as multimedia components or the navigation system, can also be provided.

One important prerequisite for the reliable provision of these functions lies in particular with the energy and/or data infrastructure in the vehicle. Proper functioning of many of the electronics components thus depends on a data exchange with other components. Faultless data transmission must therefore especially be ensured in functions that are highly relevant to safety, such as an airbag function, or in functions that relate to the driving operation of the vehicle. Equally as decisive is the reliable energy supply to ensure the error-free operation of the components.

There is often a drawback here that ensuring a reliable energy and/or data supply is very costly and complex. Furthermore, the expandability and adaptability is often still limited due to the complex configuration and the adaptions of the energy and/or data infrastructure required for reasons of high safety. Conventional solutions are thus often correspondingly high-cost. In particular, conventional data and/or energy transmission systems are complex and inflexible. A large construction space is also often required.

SUMMARY

It is therefore an object of the present invention to at least partly reduce the above-described drawbacks. In particular, it is an object of the present invention to increase security in a data and/or energy distribution, in particular to reduce the proneness to errors and to increase system fail-safeness or fault tolerance. Furthermore, in particular the expandability and/or flexibility as well as in particular the error management during operation of a system for data and/or energy distribution is to be improved.

The above object is achieved by means of a system having the features of claim 1, and by means of a method as described below. Further features and details of the invention result from the respective dependent claims, the description and the drawings. Features and details described in conjunction with the system according to the invention naturally likewise apply in conjunction with the method according to the invention, and vice versa, so that with regard to the disclosure, reference is or can be always reciprocally made to the individual aspects of the invention.

The object is in particular achieved by a system for energy and/or data transmission, in particular energy and/or data distribution, in a vehicle.

In particular, it is provided here that the system according to the invention comprises at least one and/or multiple node element(s) for the networked connection of at least two electric components of the vehicle, so that different and/or at least two and/or alterable and/or redundant connecting paths are and/or are being provided, and the transmission of energy and/or data (in particular for a respective connection between the connected components) occurs in an adaptable manner via at least one of the connecting paths. In particular, the provided connecting paths respectively form a connection opportunity or respectively a potential transmission path for energy and/or data. In other words, the connecting paths are provided redundantly and/or alternatively, so that at least one connecting path is available (even in the case of an error), in particular if one of the connecting paths (in the case of an error) fails or is interrupted. This has the advantage that a fault tolerance can be increased significantly. A reliable operation of the vehicle is thus ensured. Under the provision of connecting paths, it is in particular understood that the (e.g. at least two alternative or redundant) connecting paths are available and/or activatable and/or connectable under normal circumstances, so that e.g. a first or a second connecting path can selectively be activated. In particular, at least two (alternative or redundant) connecting paths are respectively provided for at least some of the components and/or node elements.

In particular, the two components are different components, preferably respectively vehicle-internal and/or onboard components, preferably components that are relevant to vehicle safety. It can further be possible for the connection to be configured as an end-to-end connection. Preferably, the transmissions can here lead along different connecting paths in the connection. It can be possible here that the connecting paths are in normal (e.g. basically) used statically, so that the connecting path remains the same for the connection between two components. Thus, in particular a first connecting path (primary connecting path) is normally used. Preferably, in case of adaptions, e.g. in an error case, the transmission of energy and/or data can be adapted, so that e.g. the connecting path is changed. For example, a second connecting path (secondary connecting path) is then used in the case of adaptions. The adaption with regard to the selection of the connecting path for the connection here preferably occurs automatically, so that the connection can be maintained, even in the case of a failure of the primary connecting path, since the secondary connecting path can be used.

The vehicle is preferably configured as a motor vehicle and/or as an electric vehicle and/or as a hybrid vehicle and/or as a passenger car and/or as an autonomous vehicle. In particular in the case of autonomous vehicles with an autonomous driving function, a driver who could intervene in the case of an error is at least partially (or temporarily) not provided. Thus, an fault-tolerant system is of particular importance here. Correspondingly, it can be possible here that the system according to the invention and/or the network and/or the node elements are adapted to an autonomous driving function of the vehicle. In particular, at least one of the electric components is configured as a control unit for the autonomous driving function. The system according to the invention preferably is configured as a system for fault-tolerant energy and/or data distribution in the vehicle.

The vehicle electronics or the electronics components of the vehicle (in particular the electric components) are preferably connected to one another without a system bus.

The energy and/or data distribution preferably occurs in a graph-oriented (networked) manner, or as a graph (network), so that preferably redundant connecting paths (transmission paths) are provided. In particular, the node elements here make an intelligent control of the energy and/or data flow possible in the network or graph. The energy and/or data flow can here occur statically and/or dynamically to ensure that a functioning connecting path is made available in the graph at all times.

The connecting path in particular relates here to at least one or multiple transmission path(s) for energy and/or data. It can be possible here that different connecting paths are provided for the distribution of energy and data. This provides the advantage that other lines can be used for the transmission of energy, which make a high current flow possible, for example. Thus, e.g. a first connecting path for energy transmission includes at least one first line, and a second connecting path for data transmission includes at least one second line. The second line is e.g. adapted for a signal transmission, e.g. shielded or the like. It can also be possible that the second connecting path includes an optical connection, e.g. a glass fiber line, for the data transmission. Nevertheless, it can be possible that the node elements respective provide and/or control the data transmission as well as the energy transmission. For example, each of the node elements may comprise an interface for a first line for the transmission of energy in the network as well as for a second line for the transmission of data in the network. Furthermore, the required construction space is hereby reduced, since no separate node elements are required for the data and energy transmission.

The electric components of the vehicle include, e.g. at least one system component of at least one of the following systems of a vehicle:
Electric Power Steering (EPS)
Electronic Stability Program (ESP)
camera system
radar system
airbag
engine control unit and/or gearbox control unit
window lifter
brakes or brake boosters
lighting system
navigation system
multimedia Especially the particularly safety-relevant components such as electronic power steering or ESP or brake booster here comprise a redundant energy and/or data connection, in particular to in each case two stage-2 node elements.

The node elements are preferably at least partly configured as intelligent network elements for the control and/or regulation of both data flow and energy flow.

In particular, a node element in a broader sense means a device and/or a network element and/or vehicle element that can provide one or multiple nodes of the network. In the narrower sense, the node element is understood as a device that provides exactly one node of the network. In particular, stage-1 node elements and stage-2 node elements can be provided here. The stage-1 node element e.g. provides at least one stage-1 node for the network. The stage-2 node element e.g. provides at least one stage-2 node for the network.

In particular, energy supply or energy transmission or energy distribution is understood as the provision of the (main) operating energy, in particular operating voltage, for at least some of the components, in particular at least in part by (or in) at least one vehicle onboard power network.

For example, it can be provided that the different connecting paths are provided by a network, in particular by multiple node elements, wherein the network preferably comprises at least the following node elements, in particular as network elements:
at least one stage-1 node element for a first stage of the network, which preferably is connected on a network side,
at least one stage-2 node element for a second stage of the network, which preferably is connected on a component side.

The component-side connection is particularly characterized in that the stage-2 node element is connected with at least one of the electric components (directly and/or immediately) at all times. The network-side connection preferably occurs exclusively in such a way that the stage-1 node element is connected with the electric components exclusively indirectly or mediately, in particular via at least one stage-2 node element.

The network topology of the network preferably is a meshed network. In particular, the network is configured as a graph, or can be described or represented by means of a graph. In particular, one or multiple, in particular different and/or redundant (alternatively usable) connecting paths are provided by the network. For this purpose, the network preferably includes nodes and/or meshes. The connecting paths are here present redundantly, in particular by the meshes of the network. Furthermore, it can be possible that a dynamic configuration of the connecting paths of the network is made possible by the node elements. In particular, a static configuration of the connecting paths in normal occurs (normal operation), and a dynamic configuration, i.e. adaption, of the connecting paths occurs in the adaptive case (adaptive operation), e.g. in an error case. The adaption here preferably is temporary, so that the system initiates a mechanism in order to return to the normal case. This can e.g. be an at least partially automatic error identification and/or isolation.

For example, a first "stage 1" is provided, which is configured to be self-organizing, stable and/or secure. The first stage can e.g. be seen as a "backbone" of the vehicle. This is made possible e.g. by the use of control units, in particular electronic control units (ECUs), which e.g. are capable of effecting an adaption of the connecting paths in the first stage (stage 1). For example, a second stage (stage 2) can be provided, which in particular serves as an interface between the first stage and the components. In particular, some or all elements of the second stage, in particular stage-2 node elements, are here connected with all components and/or with the first stage, in particular at least one stage-1 node element, so that the second stage forms an interface between the components and the first stage. It can also be possible that the network, in particular the first and/or second stage, is expandable, so that e.g. new components can be simply and reliably integrated into the network or the energy and/or data infrastructure even after the start-up of the vehicle.

It is further conceivable that a stage-1 node element, in particular as a hierarchically lower node element, is in functional connection with a stage-2 node element, in particular as a hierarchically higher node element. In particular, at least one stage-1 node element and/or at least one stage-2 node element are necessary for each component to integrate it into the energy and/or data infrastructure. For example, the system according to the invention hereby completely provides the data and/or energy infrastructure for the entire vehicle, e.g. also for the onboard power supply system.

It can advantageously be possible that at least one stage-1 node element generates a dynamic graph for the energy and/or data distribution, and/or at least one stage-2 node element is used as an access point and/or point of origin for the graph.

It can preferably be possible that at least one stage-1 node element performs an initiation process (booting process), in particular after the provision of an energy supply for the stage-1 node element and/or after the switching-on, and hereby tests e.g. at least one interface of the stage-1 node element (i.e. the distinct interfaces). In the context of the test, it is detected, for example, whether the respective interface is connected with a further stage-1 node element. In this way, the stage-1 node element can at least partially detect the network infrastructure and/or form a graph (the network), which can be used to provide an energy and/or data infrastructure. In particular, a data exchange between the stage-1 node elements, which are connected with one another, is also conducted during this test. A calculation routine is preferably conducted to calculate a graph with redundant connecting paths for the energy and/or data infrastructure. In other words, redundant paths are calculated for the network. In particular, firstly a static graph is generated here, i.e. in particular static connecting paths for the network are established. In the adaptive case, at least one alternative connecting path can then be determined, if necessary, dynamically. Thus, different connecting paths can be provided.

Furthermore, it is conceivable that in particular in the initiation process a test is conducted by at least one stage-1 node element, as to whether and/or how many stage-2 node elements are connected with the respective stage-1 node element. In particular at least one static route (e.g. connecting path) is identified for each one of the stage-2 node elements connected with the stage-1 node element and/or assigned to the respective stage-2 node element. A first static route for the energy transmission and a second static route for the data transmission is preferably allocated and/or identified. The first static route here preferably differs from the second static route.

It can be possible that either a data transmission or an energy transmission, or both a data and energy transmission are provided for a respective component by a stage-2 node element. Furthermore, it is conceivable that a respective component is configured as a redundant component so that the redundant component must be connected with two different stage-2 node elements. This particularly serves the redundant energy and/or data transmission by the stage-2 node element for the redundant component. In this way, a safe and particularly reliable data infrastructure and energy infrastructure can be made possible.

Furthermore, it can be possible that particularly during or after the initiation process, at least one stage-1 node element and/or at least one stage-2 node element initiates communication with an energy management unit and/or with a data management unit. In particular, it is possible hereby that a load control and/or a load diagnostic and/or load changes are effected e.g. by the energy management unit, and/or connecting paths are changed by the data management unit and/or routing tables are updated and/or network information is evaluated, in particular dependent upon a vehicle status and/or vehicle operation. Thus, a particularly reliable transmission which is adapted to the vehicle condition can be effected.

It is preferably possible that at least one node element, in particular stage-1 node element and/or stage-2 node element adapts the energy and/or data distribution dynamically, and/or conducts an error detection. The error detection preferably includes at least one of the following steps:
  identifying an error event which is specific to an error in at least one of the components (as a faulty component),
  isolating the error, preferably by an interruption of the data and/or energy transmission from and/or to the faulty component,
  adapting the connecting paths so that a new connecting path is identified to compensate for the interruption.

A reliable fault-tolerant data and/or energy transmission is ensured thereby.

In particular, at least one stage-2 node element can be configured and/or activated by at least one energy management unit and/or at least one data management unit in such a way that
  at least one load (in particular a component) is turned on and/or off, and/or
  the load is isolated, in particular by interrupting the data communication with the load, and/or
  the load is turned-off, in particular by interrupting the energy transmission to the load,
are performed by the stage-2 node element upon occurrence of an error in the load.

In particular, it is provided that the network, in particular the stage-1 node elements, are connected with at least two independent energy sources, to provide an energy infrastructure. Preferably, groups of at least two or at least four stage-1 node elements are arranged on each vehicle side or vehicle corner (i.e. front left and front right, and rear left and rear right on the vehicle), and the groups are connected with one another, so that an energy ring is generated.

In particular, it is conceivable that at least one switch is provided, which switches a (data) transmission and/or communication between the node elements, in particular stage-1 node elements and/or stage-2 node elements. At least some of the stage-1 node elements preferably are connected with one another via switches. The switch/es is/are respectively configured as an Ethernet switch, for example, e.g. at least as a 10 Mb or 100 Mb Ethernet switch. In particular, a ring can be provided for the data transmission, in order to connect multiple stage-1 node elements via Ethernet, in particular at least 10 Mb or 100 Mb Ethernet. In particular, one or multiple components, in particular at least 2 or at least 4 or at least 6 components, are connected jointly on a single stage-2 node element, and connected with one of the stage-1 node elements via the stage-2 node element, so that a communication of different components e.g. via the Ethernet or the ring (indirectly) is possible via the stage-2 node elements.

It is optionally also conceivable that a network, in particular a meshed network, is formed by multiple stage-1 node elements to dynamically generate and/or change the connecting paths, wherein the stage-2 node elements are respectively connected, as input and output points, to the connecting paths, with the network. To establish the network, communication preferably takes places between at least some of the node elements amongst one another. In particular, the node elements are connected with one another via lines, preferably electric lines. Different lines are preferably provided for energy and data transmission. The network particularly preferably includes a first network for the energy transmission and a second network for the data transmission, in particular each with a different structure.

This makes the provision of a network structure, which is adapted to the respective transmission and which is especially reliable, possible.

Furthermore, in the scope of the invention, it can be provided that a network including multiple stage-1 node elements id provided, wherein for establishing the connection between a first and a second component
- the first component is connected with a first stage-2 node element, which is connected with a first stage-1 node element of the network, and
- the second component is connected with a second stage-2 node element, which is connected with a second stage-1 node element of the network, wherein the first stage-1 node element preferably is connected with the second stage-1 node element via further stage-1 node elements. In particular, a connecting path for the components is provided thereby via the first stage-2 node element, then via the first stage-1 node element, and then via the further stage-1 node elements, and then via the second stage-1 node element, and then via the second stage-2 node element. In particular, it can be possible that the first stage-2 node element differs from the second stage-2 node element, and the first stage-1 node element differs from the second stage-1 node element. In redundant components, it can be provided that these components are respectively connected with two stage-2 node elements in order to ensure an especially reliable and failsafe energy and/or data supply.

It can preferably be provided in the scope of the invention that an energy infrastructure for the electric components is provided by means of multiple node elements, wherein multiple stage-2 node elements and multiple stage-1 node elements are connected with one another as a network to that end, so that in each case at least one network branch is connected in the network through at least one of the stage-1 node elements, wherein these stage-1 node elements each comprise one switching element for interrupting or enabling an energy supply to the respective network branch. In particular, at least one connecting path for the energy supply can be interrupted or produced by the switching element. In this way, network branches or individual components or groups of components can be excluded from the energy supply in this way, or components can be supplied with energy in a targeted manner. It is also conceivable that an amount of energy supply is and/or can be adjusted by means of the switching element. To that end, the switching element includes an adjustable resistor or the like, for example.

Furthermore, it is optionally possible in the scope of the invention that the stage-2 node elements are respectively connected with at least one or exclusively one of the components, in particular directly and/or immediately, preferably via a component interface, in order to enable an energy supply of these respective components, wherein the stage-2 node elements each comprise a switch in order to interrupt or establish the energy supply to the respectively connected component, wherein the stage-2 node elements preferably each comprise a safety switching means to interrupt the energy supply to the respectively connected component in a safety-critical state. In particular, the safety switching means is an electric fuse, and can preferably exclusively irreversibly be brought from a closed state (energy supply is established) into an opened state (energy supply is interrupted), however, preferably not vice versa. The switch means can preferably be actuated by an energy management unit. The safety switching means can (exclusively) automatically and/or independently from the energy management unit perform a switching and/or not be actuated by the energy management unit. The safety-critical state, in which in particular the safety switching means switches, is e.g. an overcurrent or an overvoltage or the like. Thus, a fuse which is independent of the energy management unit is provided.

It is optionally conceivable that at least two, in particular independent energy sources, in particular of different type, are connected with the network, in particular (directly) via in each case different ones of the stage-1 node elements, so that if the energy supply to one (in particular any) network branch with one of the energy sources is interrupted, the energy supply for the remaining network branches is established (at all times or) via a further one of the energy sources, and in particular also vice versa. In particular, the energy sources are configured differently, e.g. as a vehicle battery or as a high-voltage battery in an electric vehicle, or a direct voltage converter or an alternator, or the like. For example, a vehicle battery is a first energy source, and a generator is a second energy source, for example. Accordingly, it can be possible that a primary and secondary energy source are provided. The primary energy source is e.g. used normally to supply energy to the components, and the secondary energy source is used or connected-in for energy supply of the components only in the adaptive case. As a result, reliability and fault tolerance is further increased.

In a further option, it can be provided that a data infrastructure for the electric components is provided by multiple node elements, so that the components are each connected via at least one stage-2 node element with at least one respective stage-1 node element, wherein the stage-1 node elements form a network with network branches, and the network branches and/or stage-1 node elements are connected with one another via switches, wherein the stage-1 node elements and/or the stage-2 node elements preferably are respectively also configured for the provision of the energy supply in accordance with an energy infrastructure to the components. In particular, the data transmission can be adjusted and/or blocked individually for each network branch and/or for each of the components, preferably by means of the respective (directly) connected stage-2 node elements. It can be possible that first network branches for the energy transmission are provided for a first network for the energy transmission, and second network branches for the data transmission are provided for a second network for the data transmission, each with different lines. Thus, energy transmission for one of the components can still be available even if the data transmission is blocked, for example.

It can be possible in the scope of the invention that the stage-2 node elements are each configured to carry out a safety-related isolation of the component which is connected with the respective stage-2 node element with regard to data infrastructure and/or energy infrastructure, so that communication of the respective component with the further components of the network and/or an energy supply of the respective component is prevented. "Safety-related" particularly means an event which, during the operation of the vehicle, puts safety at risk. In particular, the stage-2 node elements each comprise a connectable communication interface to respectively one electric component connected to that stage-2 node element. In particular, a reactivation test of an isolated network branch or of an isolated component is conducted after the isolation. This reactivation test is conducted e.g. repeatedly, in order to subsequently provide a reactivation result or test result through the node element that conducts the reactivation test. If a reactivation is not possible, a permanent warning is output, for example. This results in the advantage that a solution can be found for errors at an early time. For example, the energy consumption in at least one network branch can be reduced for this purpose. A search for a solution can occur at least partially automatically, preferably by the energy management unit.

Alternatively or additionally, an isolation of (individual) network branches or (individual) components can be effected via at least one node element, in particular a stage-2 node element, in such a way that a data communication with the concerned network branch or the concerned component is interrupted or filtered. In particular, a reconfiguration of the stage-2 node element can be effected in real time, in order to deactivate, for example, the communication in the adaptive case and/or in an error case, in particular in a safety problem.

Optionally, it can be provided that the node elements form a data infrastructure for the distribution of data between the components as well as an energy infrastructure for the energy supply, in particular with an operating voltage, for the components. In other words, the node elements each have a data function as well as an energy function for the data and or energy transmission to the components. Construction space can in particular be saved thereby, and costs for further devices be reduced. The network structure and/or topology of the data infrastructure preferably differs from the network structure and/or topology of the energy infrastructure. In particular, each of the node elements is configured to influence, in particular dynamically and/or statically adapt, the energy flow as well as the data flow.

The invention also relates to a method for energy and/or data transmission in a vehicle. In particular at least one node element is provided to that end.

It is preferably provided that at least one of the following steps is conducted, wherein the steps are preferably conducted successively or in any order, wherein individual steps preferably can be conducted repeatedly:

connecting of at least two electric components of the vehicle via the at least one node element, so that an (in particular first) connecting path is used for a transmission of energy and/or data, (automatically) changing the used connecting path depending on a specification and/or an event, so that the transmission of energy and/or data is adapted to the specification and/or event (automatically, in particular by the at least one node element).

Thus, the method according to the invention provides the same advantages as have been described in detail with respect to the system according to the invention. Moreover, the method can be suitable to be conducted by means of a system according to the invention.

It is preferably possible that the at least one node element comprises at least one electronics component. The electronics component preferably comprises at least one microprocessor and/or integrated circuit and/or the like. It is in particular provided here, that the electronics component is configured to at least partially conduct the method according to the invention, and/or to activate the node element in such a way that the method according to the invention is at least partially conducted.

It can be possible that at least one or each of the node elements is respectively connected with at least one or at least two or at least three further node elements, in particular directly or immediately.

In particular, the connection of the node elements (with one another) is configured to conduct a data and/or energy transmission between the node elements. The node elements preferably are configured onboard and/or integrated in the vehicle.

It is preferably provided that one or each connecting path is formed by the connection of at least or exclusively two node elements.

In particular, the change of the used connecting path can be effected in that the used connecting path is interrupted or established, and/or the used connecting path is changed, so that a second connecting path is used instead of a first connecting path, for example, and/or the used connecting path is adapted with respect to a transmission parameter, such as a transmission rate (in data) or an energy parameter (such as a power maximum), in particular dependent upon the specification.

The event and/or error occurs e.g. in at least one of the following states:

at least one of the network branches has an error, e.g. a short-circuit or a ground break, or the like, at least one of the components has an error, e.g. an energy consumption which exceeds a predetermined threshold value, at least one of the components transmits erroneous data, at least one connecting path has an error, e.g. an interrupted connecting line.

The specification includes a distribution specification or optimization specification or a load distribution, for example, and is preferably made available by the energy management unit and/or the data management unit, to optimize the data and/or energy distribution.

In the invention, it can advantageously be provided that an energy infrastructure for energy supply of the components, in particular with an operating voltage, and a data infrastructure for data transmission between the components, is provided by a network, so that dependent upon the data transmission, the data and/or energy transmission to at least one component connected with the node element is controlled by the respective node elements. In particular, the connecting path is static if a positive detection of an event fails to appear, and is dynamically adapted only upon a positive detection of the event. It can for example be possible that the event, or an actuation information, is transmitted to the node element or at least one of the node elements by the data transmission, and is evaluated by the respective node element. For example, now, dependent upon this evaluation, a switching element and/or a switching means can be actuated. As a result, a flexible structure of the network and a flexible adaption of the energy and/or data supply are possible.

It is optionally also conceivable that an error (as an event) is detected by the node element, and, upon positive detection of the error, the energy supply is automatically interrupted by the node element, so that a first connecting path is interrupted, wherein a second connecting path is provided to compensate the interruption. Thus, fail-safeness and fault tolerance are significantly increased.

The invention will be described in greater detail by means of the attached drawings. The features mentioned in the claims and in the description can per se or on any combination be essential to the invention. The Figures show in:

DETAILED DESCRIPTION

Figure 1:
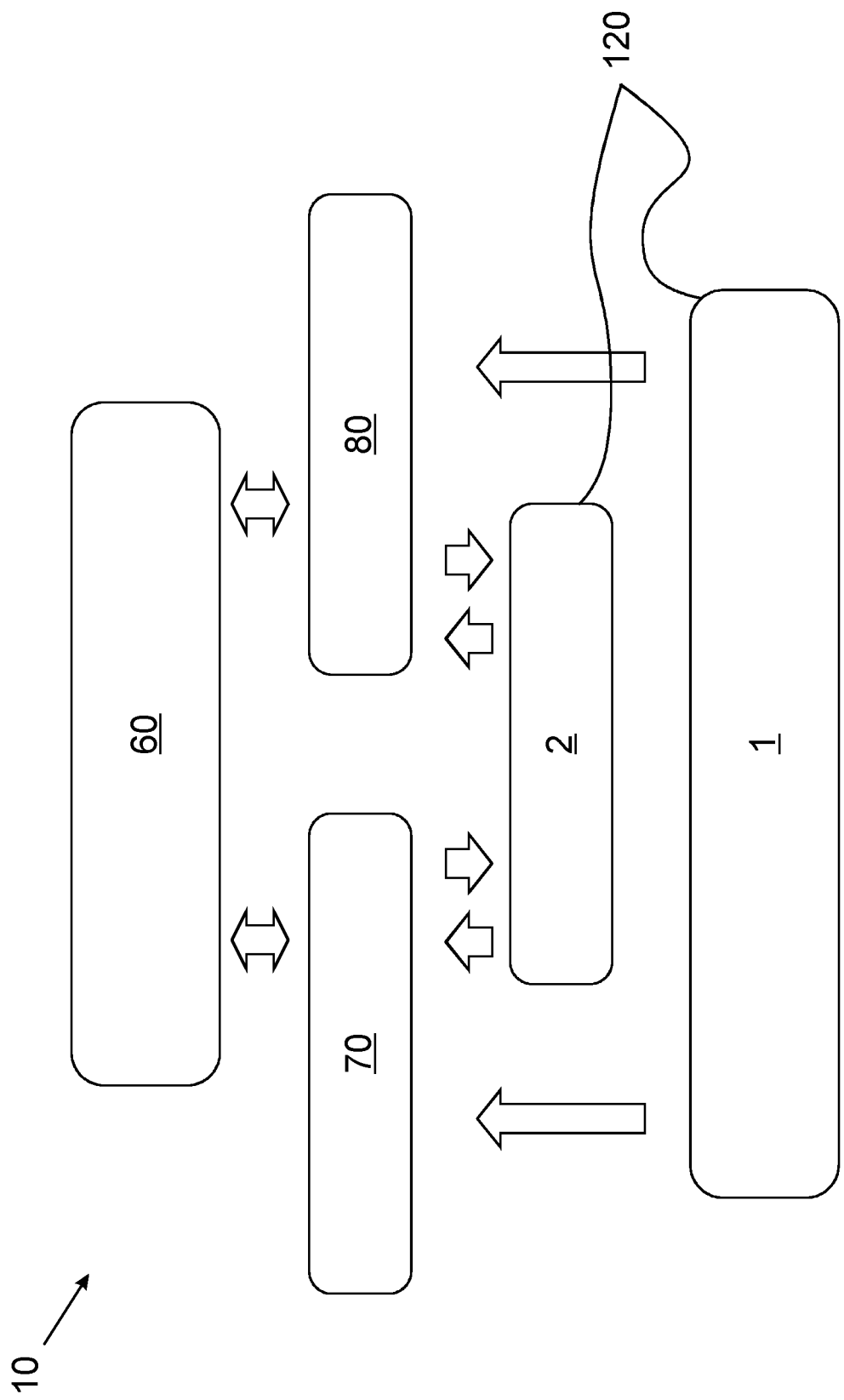
FIG. 1 shows a schematic representation of a system according to the invention and of a method according to the invention.

Identical reference characters will be used for like technical features even of different exemplary embodiments throughout the below Figures.

FIG. 1 schematically visualizes a method according to the invention, wherein parts of the system 10 according to the invention are also illustrated. Thus, a superordinate vehicle control unit 60 is shown, which carries out communication with and/or a control of an energy management unit 70 and a data management unit 80 of the vehicle 15. The energy management unit 70 and/or the data management unit 80 control and/or communicate respectively with at least one node element 120, in particular with at least one stage-2 node element 2. At the same time, it is possible for the energy management unit 70 and/or the data management unit 80 to respectively communicate with a stage-1 node element 1 and/or to receive information from the stage-1 node element 1. The node elements 120 can form a network 110, which is managed e.g. via the vehicle control unit 60 and/or energy management unit 70 and/or data management unit 80, in particular by the described communication.

Figure 2:
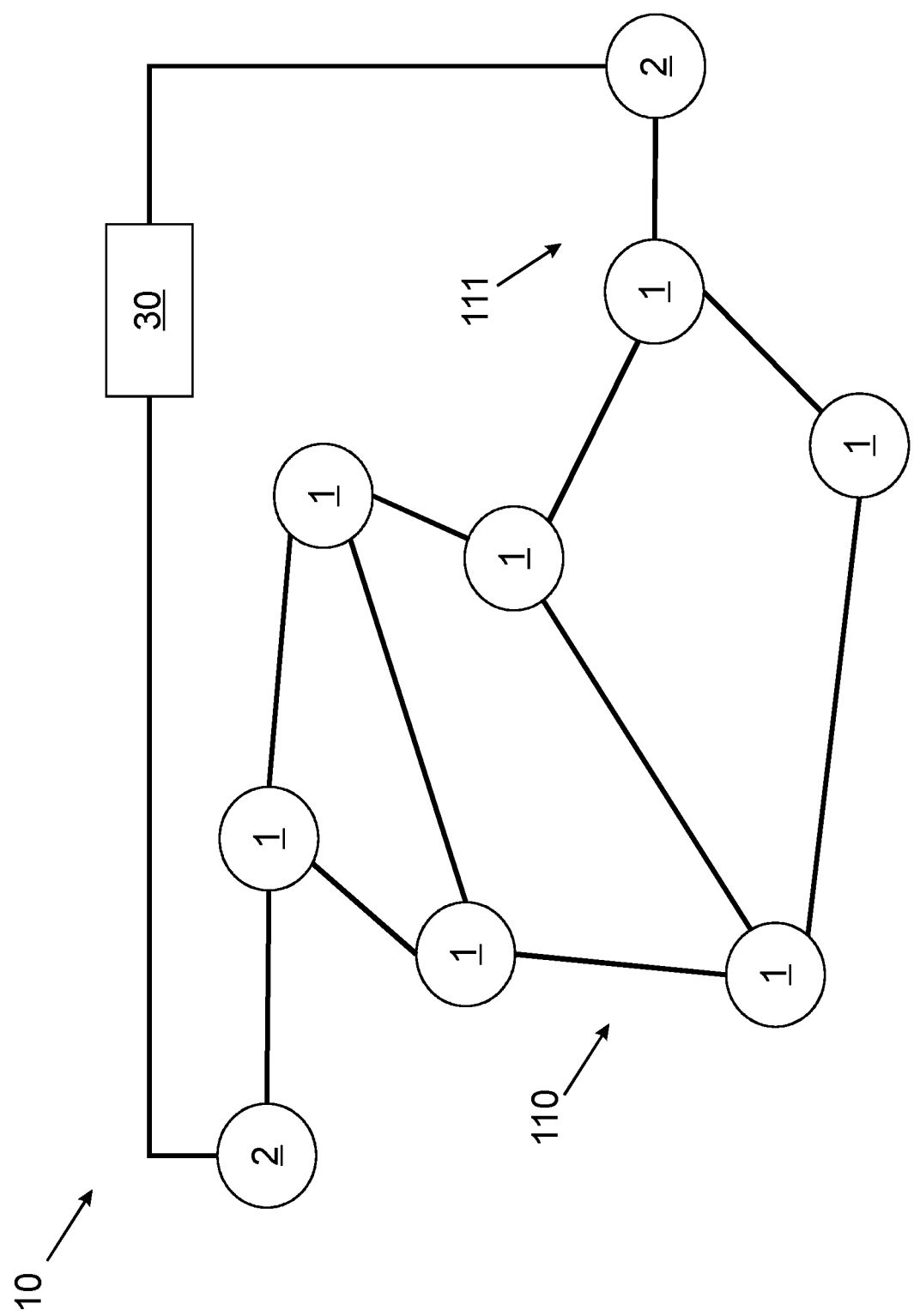
FIG. 2 shows a schematic representation of a network structure.

FIG. 2 shows a possible structure of the network 110 or a graph 110 with associated interfaces, in particular node elements 120. Likewise shown is an electric component 30 of the vehicle 15, which is configured as a redundant component 30 in this case, by way of example. Such a redundant component 30 is an EPS of the vehicle 15, for example. In general, the components 30 can be connected with the network 110 via a single stage-2 node element 2 or, in the case of redundant components 30, redundantly via at least two stage-2 node elements 2. The respective stage-2 node elements 2 are connected with different stage-1 node elements 1 of the network 110. In this way, an alternative connecting path can be provided even in a failure of one of the network branches 111 and/or connecting paths, which are present e.g. between two stage-1 node elements 1.

Figure 3:
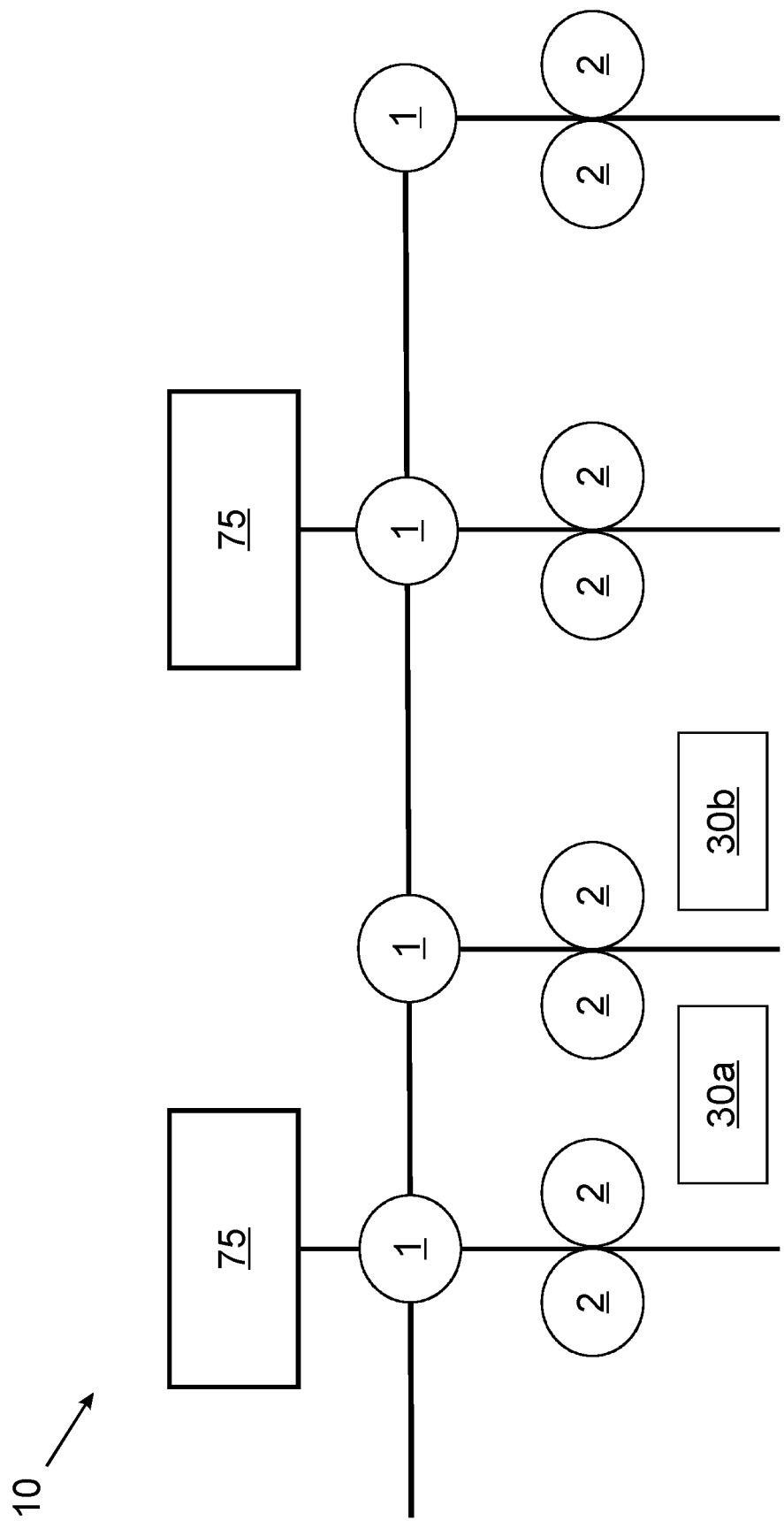
FIG. 3 shows a schematic representation of parts of a system according to the invention.
Figure 4:
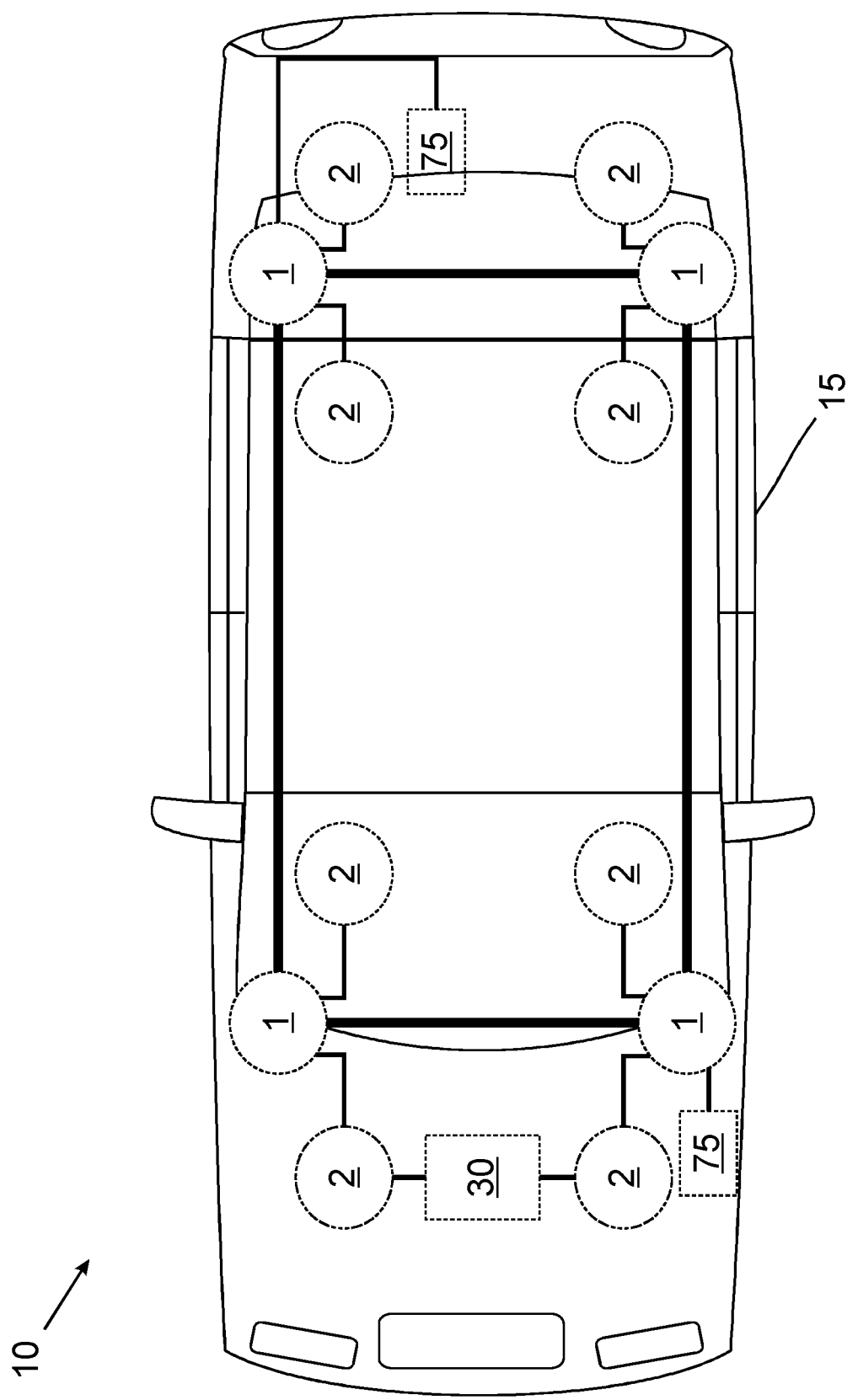
FIG. 4 shows further schematic representations of parts of a system according to the invention, in particular, an exemplary structure of the energy infrastructure.

FIGS. 3 and 4 schematically show an energy infrastructure for the vehicle 15, which is provided by the network 110. For this purpose, the network 110 comprises e.g. a first network 110 for energy transmission.

It is discernable in FIG. 3 that two different energy sources 75 are provided to increase fault tolerance. These sources are respectively connected with different stage-1 node elements 1, which in turn are connected with different stage-2 node elements 2. Furthermore, the stage-1 node elements are also connected amongst one another, in particular so that an energy ring of the vehicle 15 is formed, e.g. via first lines for energy transmission. For example, the stage-1 node elements 1 respectively form a region in which the stage-2 node elements 2 are connected with the stage-1 node element 1, and/or respectively network branches 111. It is schematically shown that at least one first component 30a and one second component 30b can be connected with respective different stage-2 node elements 2 or in different regions or network branches 111. Furthermore, redundant components 30 can also be connected with at least two different regions or network branches 111, for example. This can significantly increase the system stability.

FIG. 4 shows, by way of example, a structure of the energy infrastructure. It is discernable that a redundant component 30 is connected with two different stage-2 node elements 2. Furthermore, two different energy sources 75 are provided. Furthermore, it is discernable that components 30 are connected with the network 110 in different zones of the vehicle 15 (e.g. in the front and/or rear zone).

Figure 5:
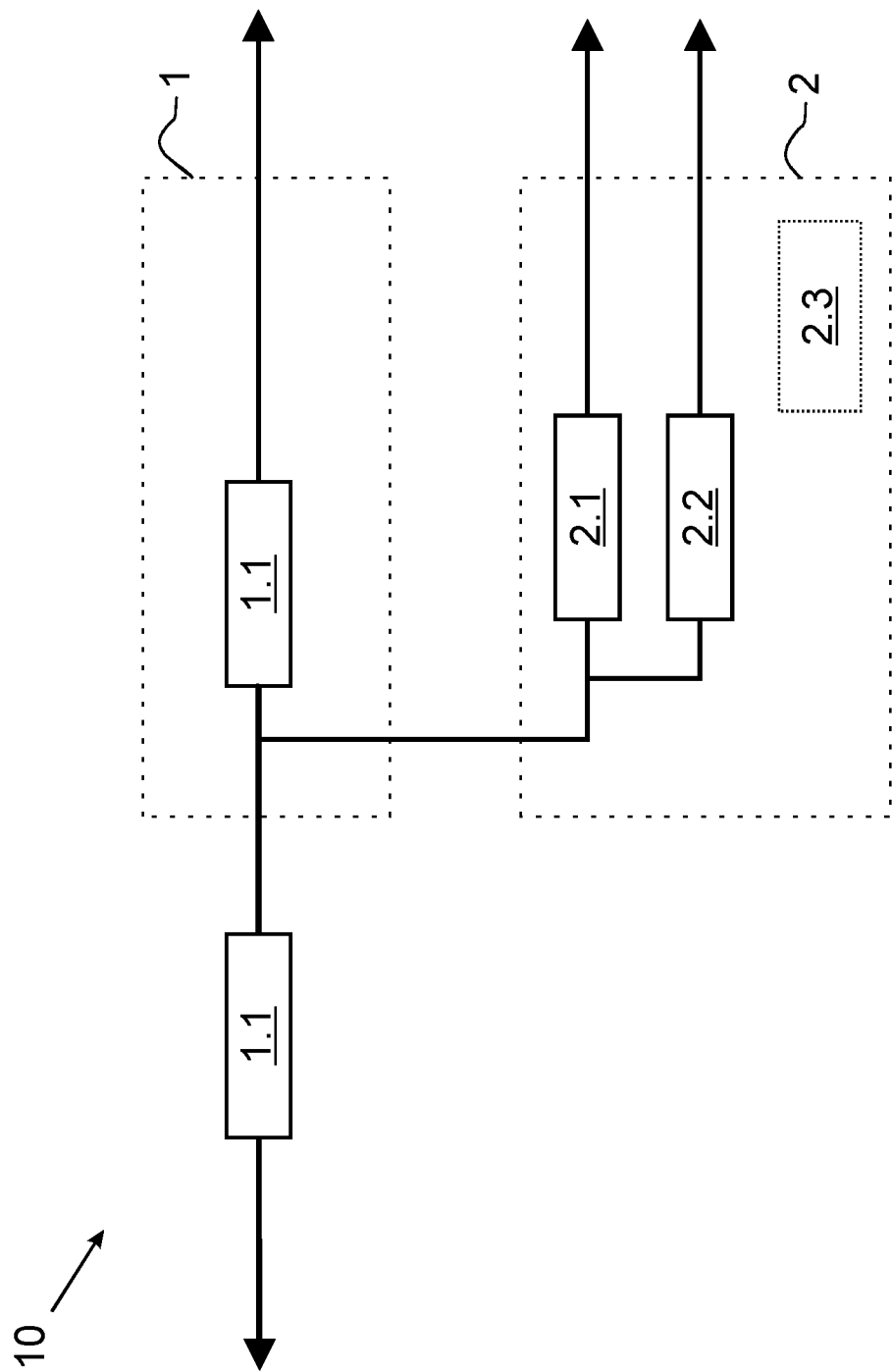
FIG. 5 shows further schematic representations of parts of a system according to the invention, in particular, an exemplary structure of a stage-1 node element and a stage-2 node element in terms of functionality of the respective node elements for the provision of an energy infrastructure.

FIG. 5 schematically, and by way of example, shows the structure of a stage-1 node element 1 and a stage-2 node element 2 in terms of functionality of the respective node elements 120 for the provision of an energy infrastructure. For example, the stage-1 node element 1 includes a switching element 1.1, which is used to interrupt an energy supply. In particular, the stage-2 node element 2 includes a switching means 2.1 and/or a safety switching means 2.2 and/or a component interface 2.3 for the connection with a component 30. It is discernable that the stage-1 node element 1 is electrically-connected with the stage-2 node element 2, preferably via a corresponding interface.

Figure 6:
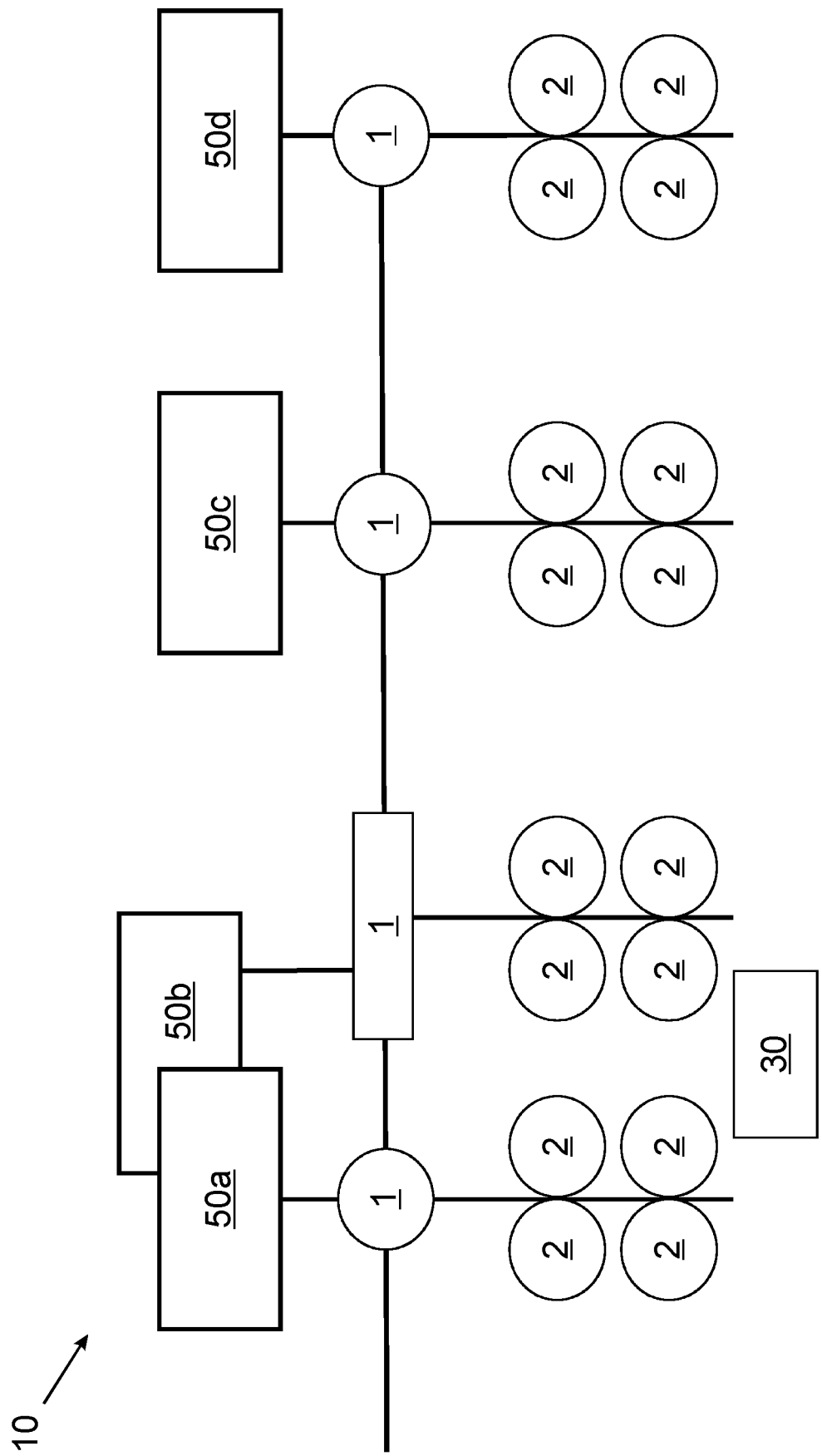
FIG. 6 shows further schematic representations of parts of a system according to the invention, in particular, an exemplary data infrastructure for a vehicle, which is provided by a network.
Figure 7:
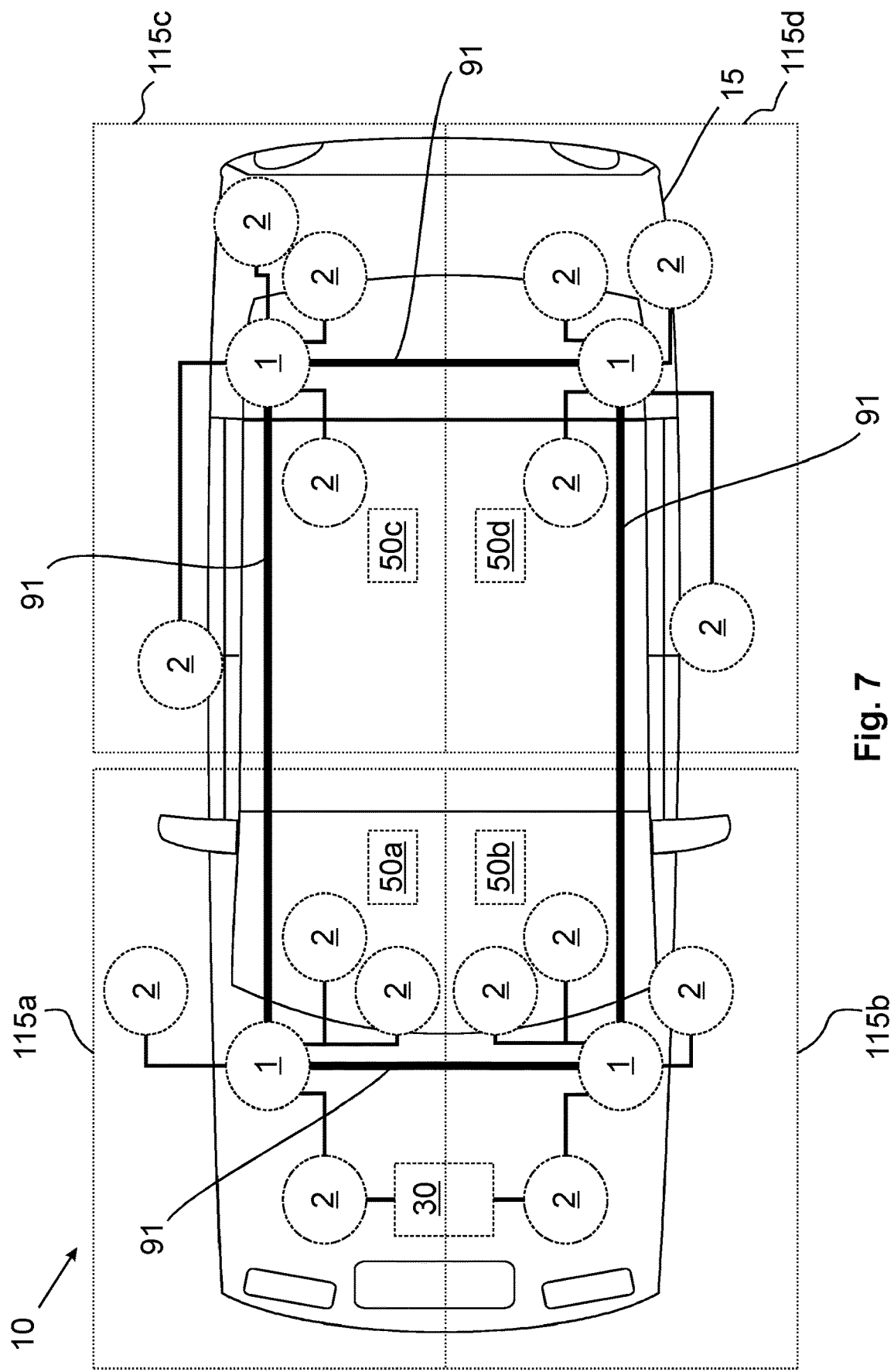
FIG. 7 shows further schematic representations of parts of a system according to the invention, in particular, an exemplary data infrastructure for a vehicle, which is provided by a network.
Figure 8:
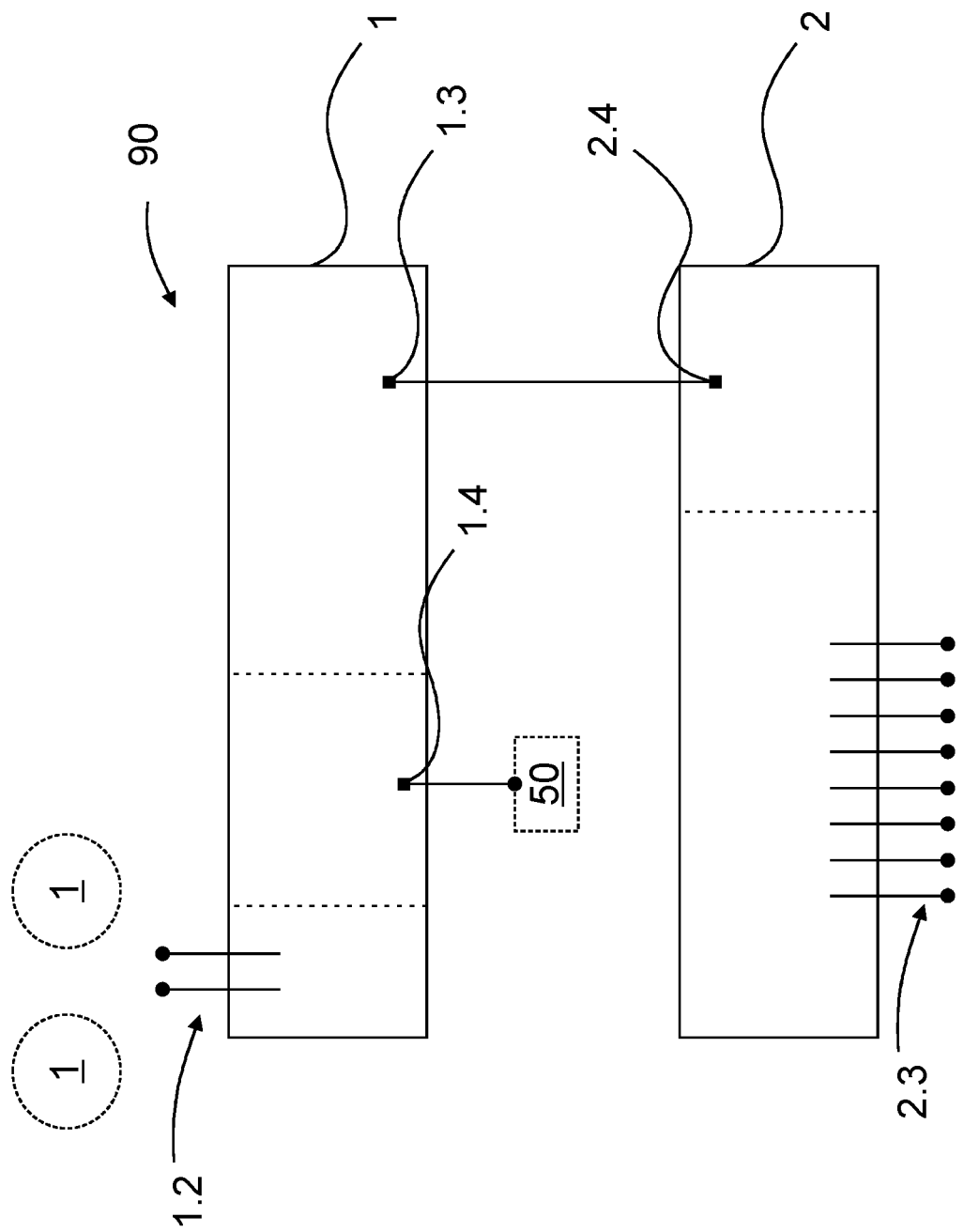
FIG. 8 shows further schematic representations of parts of a system according to the invention, in particular, an exemplary structure of a stage-1 node element and of a stage-2 node element in terms of functionality of the respective node elements for the provision of a data infrastructure.

FIGS. 6 and 7 schematically show a data infrastructure for the vehicle 15, which is provided by the network 110. For this purpose, the network 110 e.g. includes a second network 110 for the distribution of data. It is discernable that different control units 50, in particular ECUs, are provided for different vehicle zones. A first vehicle zone 115a and a second vehicle zone 115b and a third vehicle zone 115c as well as a fourth vehicle zone 115d are schematically shown in FIG. 6. In this case, a first ECU 50a can be assigned to the first vehicle zone 115a, a second ECU 50b can be assigned to the second vehicle zone 115b, a third ECU 50c can be assigned to the third vehicle zone 115c, and a fourth ECU 50d can be assigned to the fourth vehicle zone 115d. In particular, the respective ECUs 50 are each connected with a stage-1 node element 1 via a controller interface 1.4, wherein the stage-1 node element 1 is also assigned to the respective vehicle zone, as the case may be. The vehicle zones or the corresponding stage-1 node elements 1 preferably are connected with one another via switching paths 91. For example, switches 90 are used for this purpose, which, in particular, are configured as an Ethernet switch. As shown in FIG. 8, a switch 90 can likewise be integrated in a stage-1 node element.

FIG. 8 schematically and by way of example shows the structure of a stage-1 node element 1 and of a stage-2 node element 2 in terms of functionality of the respective node elements 120 for the provision of a data infrastructure. In this case, the stage-1 node element 1 may comprise an interface toward further stage-1 node elements 1 (e.g. a ring interface 1.2). Moreover, a stage-1-to-stage-2 interface 1.3 can be provided, which connects the stage-1 node element 1 with the stage-2 node element 2. On the other hand, the stage-2 node element 2 may comprise a corresponding stage-2-to-stage-1 interface 2.4. Moreover, the stage2 node element 2 comprises at least one component interface 2.3 for the connection with the components 30.

The above description of the embodiments describes the present invention exclusively by way of examples. Individual features of the embodiments can, as far as technically feasible, be combined with one another in any ways and manners without departing from the scope of the present invention.

LIST OF REFERENCE CHARACTERS

1 stage-1 node element
1.1 switching element
1.2 ring interface
1.3 stage1-to-stage2 interface
1.4 controller interface, ECU interface
2 stage-2 node element
2.1 switching means
2.2 safety switching means
2.3 component interface, communication interface
2.4 stage-2-to-stage-1 interface
10 system
15 vehicle
30 component, EPS
30*a* first component
30*b* second component
50 controller, ECU
50*d* fourth ECU
50*a* first ECU
50*b* second ECU
50*c* third ECU
60 vehicle control unit
70 energy management unit
75 energy sources
80 data management unit
90 switches
91 switching paths
110 network, graph
111 network branches
115*d* fourth vehicle zone
115*a* first vehicle zone
115*b* second vehicle zone
115*c* third vehicle zone
120 node element

The invention claimed is:

1. A system for energy and/or data transmission in a vehicle, comprising at least one node element for the networked connection of at least two electric components of the vehicle, so that different connecting paths are provided, and the transmission of energy and/or data occurs in an adaptable manner via at least one of the connecting paths, wherein the different connecting paths are provided by a network, wherein the network comprises at least the following node elements:
   at least one stage-1 node element for a first stage of the network, which is connected on a network side,
   at least one stage-2 node element for a second stage of the network, which is connected on a component side,
wherein at least one component of the at least two electric components is configured as a redundant component so that the redundant component is connected with two different stage-2 node elements.

2. The system according to claim 1, wherein a network for the dynamic generation and/or change of the connecting paths is formed by multiple stage-1 node elements, wherein the stage-2 node elements are respectively connected with the network as input and output points to the connecting paths.

3. The system according to claim 1, wherein
a network with multiple stage-1 node elements is provided, wherein
for establishing the connection between a first and second component the first component is connected with a first stage-2 node element, which is connected with a
first stage-1 node element of the network, and the second component is connected with a second stage-2 node element, which is connected with
a second stage-1 node element of the network,
wherein the first stage-1 node element is connected with the second stage-1 node element via further stage-1 node elements.

4. The system according to claim 1, wherein
an energy infrastructure for the electric components is provided by multiple node elements, wherein multiple stage-2 node elements and multiple stage-1 node elements are connected to one another as a network for this purpose, so that in each case at least one network branch is connected in the network by means of at least one of the stage-1 node elements, wherein these stage-1 node elements respectively comprise a switching element for interrupting or enabling an energy supply to the respective network branch.

5. The system according to claim 4, wherein
the stage-2 node elements are respectively connected with at least one of the components to make an energy supply of these respective components possible, wherein the stage-2 node elements each comprise a switching means to interrupt or establish the energy supply to the respectively connected component, wherein the stage-2 node elements each comprise a safety switching means to interrupt the energy supply to the respectively connected component in a safety-critical state.

6. The system according to claim 4, wherein
at least two, in particular independent, energy sources, in particular of different type, are connected with the network in particular via respectively different ones of the stage-1 node elements, so that if the energy supply to a network branch with one of the energy sources is interrupted, the energy supply for the remaining network branches is established via a further one of the energy sources, and in particular vice versa as well.

7. The system according to claim 4, wherein
the stage-2 node elements are respectively configured to carry out a security-related isolation of the component connected with the respective stage-2 node element in terms of the data infrastructure and/or the energy infrastructure, so that communication of the respective component with further components of the network and/or an energy supply of the respective component is prevented.

8. The system according to claim 1, wherein
a data infrastructure for the electric components is provided by multiple node elements, so that the components are each connected via at least one stage-2 node element with at least one respective stage-1 node element, wherein the stage-1 node elements form a network with network branches, and the network branches and/or stage-1 node elements are connected to one another via switches, wherein the stage-1 node elements and/or the stage-2 node elements are respectively also configured to provide the energy supply to the components in accordance with an energy infrastructure.

9. The system according to claim 1, wherein the node elements form a data infrastructure for data distribution between the components as well as an energy infrastructure for energy supply, in particular with an operating voltage, for the components.

10. A method for energy and/or data transmission in a vehicle, with at least one node element, the method comprising:
connecting at least two electric components of the vehicle via the at least one node element, so that a connecting path is used for a transmission of energy and/or data, changing the used connecting path dependent upon a specification and/or an event, so that the transmission of energy and/or data is automatically adapted to the specification and/or the event; wherein a system comprising a network comprising at least the following node elements:
at least one stage-1 node element for a first stage of the network, which is connected on a network side, and
at least one stage-2 node element for a second stage of the network, which is connected on a component side, wherein at least one component of the at least two electric components is configured as a redundant component so that the redundant component is connected with two different stage-2 node elements,
so that different connecting paths are provided, and the transmission of energy and/or data occurs in an adaptable manner via at least one of the connecting paths, is operated to carry out the method.

11. The method according to claim 10, wherein an energy infrastructure for energy supply of the components, in particular with an operating voltage, and a data infrastructure for the transmission of data between the components is provided by a network, so that the data and/or energy transmission to at least one component connected with the node element is controlled dependent upon the data transmission by the respective node elements.

12. The method according to claim 10, wherein an error is detected as an event by the node element, and an automatic interruption of the energy transmission is effected by the node element upon positive detection of the error, so that a first connecting path is interrupted, wherein a second connecting path is provided to compensate the interruption.

* * * * *